(12) United States Patent
Moore

(10) Patent No.: US 6,840,003 B2
(45) Date of Patent: Jan. 11, 2005

(54) LIGHT EMITTING INSECT TRAP

(76) Inventor: Dale Moore, Hwy. 19 South 4033, Sulphur Springs, TX (US) 75482

( * ) Notice: Subject to any disclaimer, the term of this patent is extended or adjusted under 35 U.S.C. 154(b) by 67 days.

(21) Appl. No.: 10/357,337

(22) Filed: Feb. 4, 2003

(65) Prior Publication Data

US 2004/0148846 A1 Aug. 5, 2004

(51) Int. Cl.$^7$ .............................................. A01M 1/08
(52) U.S. Cl. ........................................ 43/113; 43/139
(58) Field of Search .................................. 43/113, 139

(56) References Cited

U.S. PATENT DOCUMENTS

| | | | | |
|---|---|---|---|---|
| 1,144,358 | A | * 6/1915 | Gyllstrom | 43/113 |
| 1,484,369 | A | * 2/1924 | Andreucci | 43/139 |
| 2,040,276 | A | * 5/1936 | Shinner | 43/139 |
| 2,236,698 | A |   4/1941 | Rector | 43/139 |
| 3,001,321 | A | * 9/1961 | Mauro et al. | 43/139 |
| 3,058,257 | A |  10/1962 | Brophy et al. | 43/139 |
| 3,120,075 | A | * 2/1964 | Barnhart, Sr. | 43/139 |
| 3,336,694 | A |   8/1967 | O'Connell | 43/139 |
| 4,282,673 | A |   8/1981 | Focks et al. | 43/113 |
| 5,157,865 | A | * 10/1992 | Chang | 43/113 |
| 5,205,065 | A | * 4/1993 | Wilson et al. | 43/113 |
| 5,301,458 | A |   4/1994 | Deyoreo et al. | 43/139 |
| 5,329,725 | A | * 7/1994 | Bible | 43/113 |
| 5,813,166 | A | * 9/1998 | Wigton et al. | 43/113 |
| 6,286,249 | B1 |   9/2001 | Miller et al. | 43/139 |

FOREIGN PATENT DOCUMENTS

| | | | | |
|---|---|---|---|---|
| AU | 27166 B1 | * 3/1931 | | 43/113 |
| BR | 9503912 A1 | * 10/1997 | | |
| CA | 2073163 B1 | * 1/1994 | | |
| CA | 2099389 B1 | * 12/1994 | | |
| EP | 746977 B1 | * 12/1996 | | |
| FR | 1425878 B1 | * 12/1965 | | 43/139 |
| GB | 206667 B1 | * 11/1923 | | 43/139 |
| GB | 662897 B1 | * 12/1951 | | 43/139 |
| GB | 1119478 B1 | * 7/1968 | | 43/139 |
| JP | 5-161443 B1 | * 6/1993 | | |
| JP | 11-103747 B1 | * 4/1999 | | |
| JP | 11-289948 B1 | * 10/1999 | | |
| JP | 2001-231424 B1 | * 8/2001 | | |
| WO | WO-01/01768 B1 | * 1/2001 | | |

* cited by examiner

*Primary Examiner*—Darren W. Ark
(74) *Attorney, Agent, or Firm*—Richard C. Litman

(57) ABSTRACT

A light emitting insect trap comprising an insect attracting mechanism, a support framework, a suction producing mechanism, at least one section of netting, a releasable fastening device, a plurality of fan guards and a mounting means. The insect attracting mechanism is preferably a plurality of light emitting devices. Once the insects are attracted to the proximity of the insect trap by the light emitting devices the insects are drawn into the insect trap by the downdraft generated by the suction producing mechanism. The suction producing mechanism is preferably a propeller blade fan. Once the insects are drawn into the insect trap they are collected in a section of netting that is attached to the support framework of the insect trap. The releasable fastening device allows access into the netting so that the collected insects may be disposed.

11 Claims, 4 Drawing Sheets

LIGHT EMITTING INSECT TRAP

BACKGROUND OF THE INVENTION

1. Field of the Invention

The present invention relates to devices for attracting and trapping insects and, more particularly, to a light emitting insect trap that uses a plurality of light sources to attract insects into a fan-driven air flow to draw the insects into a trap.

2. Description of the Related Art

There are multiple reasons for the need to trap insects and prevent them from occupying certain areas. The most obvious reason is that insects are a nuisance to people. Also, many people suffer from allergic reactions caused by insect bites. Another reason is that many insects often carry diseases that are transferred to humans if bitten by an insect. Many devices are commonly used to attract and either kill, or trap insects. Examples of some of the common insect traps are provided in the following patent documents.

U.S. Pat. No. 2,236,698 to Rector discloses a combined insect trap and traffic light. The invention comprises a cylindrical column with open upper and lower ends. A cage-like sack is detachably suspended inside of the column. A fan is provided for creating a downdraft to draw insects through a chute into the sack. A light is provided to attract the insects into close proximity to the fan.

U.S. Pat. No. 3,058,257 to Brophy et al. discloses an insect trap with a light source for attracting insects into the vicinity of the trap. The trap provides a motor driven fan for causing air to circulate in a manner that will draw the attracted insects into a bag that may be removed and emptied. The light source used to attract the insects is a fluorescent lamp.

U.S. Pat. No. 3,120,075 to Barnhart discloses a collapsible mosquito trap. The mosquito trap in Barnhart provides a means for trapping mosquitoes and preserving them in an undamaged condition for study of population density. A low current light bulb is provided for attracting the mosquitoes into the vicinity of the trap. Netting is provided to trap the mosquitoes and to keep them out of contact with the propeller blade of the fan that provides the suction draft to draw the mosquitoes into the trap.

U.S. Pat. No. 3,336,694 to O'Connell discloses an air curtain insect trap. Insects are attracted by an ultraviolet light source and directed into a collection means. A blower produces airflow so that the attracted insects are propelled downwardly into a collection means in the form of a container having a closed bottom and an open top. The insects are propelled into the collection means ahead of the blower and do not impinge on the blades of the blower.

U.S. Pat. No. 4,282,673 to Focks et al. discloses a flying insect trap. The trap includes an electric light that is reflected by a parabolic reflector horizontally in all directions to attract the insects. An electric fan blows the mosquitoes downwardly into a collection bag. A valve is located between the fan and the collection bag. The valve is biased to close the entrance to the collection bag when the fan is not operating and to be opened by the force of the air when the fan is operating. A beetle screen is provided so that larger insects such as beetles will not pass into the collection bag, while smaller insects such as mosquitoes will not be impeded.

U.S. Pat. No. 5,301,458 to Deyoreo et al. discloses an insect attracting and killing device. The device uses a translucently diffused light source to attract insects into the vicinity of a fan-driven airflow. The fan draws the attracted insects into contact with an electrically charged grid.

U.S. Pat. No. 6,286,249 to Miller et al. discloses a counterflow insect trap. The device includes a flow mechanism structured to provide an outflow of air out of the device and to draw an inflow of air directed counter the outflow from the atmosphere into the device. An insect attractant is provided in the outflow. The flow mechanism includes an outflow channel having an opening, a fan mechanism and an inflow channel with an opening that surrounds the outflow channel opening.

A common problem with the existing insect traps is that they only attract certain types of insects, while leaving other insects free from the trap. Only certain insects are attracted to certain light sources. Different insects are present at different times depending on the time of year and the geographic location. Therefore, insect traps with only one light source are not effective in certain situations because they are not adapted to the climate and type of insects that may be present. Another common problem with existing insect traps is that they do not cover a wide area The insect traps may successfully trap insects while it is running but the minute the insect trap is turned off the area is once again infested with insects.

Therefore what is needed is an insect-attracting trap that provides a plurality of light sources to effectuate efficient insect trapping no matter where or when the trap is used.

What is further needed is an insect trap that provides a means for easily emptying and disposing of the trapped insects.

What is still further needed is an efficient insect trap that is not required to run all night long and may be used for short periods of time.

What is still further needed is an insect trap that covers a wide area so that all of the insects in a certain area are trapped and once the insect trap is turned off the area remains insect free for an extended period of time.

None of the above inventions and patents, taken either singularly or in combination, is seen to describe the instant invention as claimed. Thus a led insect trap solving the aforementioned problems is desired.

SUMMARY OF THE INVENTION

The present invention is an insect trap comprising an insect attracting mechanism, a support framework, a suction producing mechanism, at least one section of netting, a fastening device, a plurality of fan guards and a mounting means. The insect attracting mechanism comprises a plurality of light emitting devices. The insect-trap provides a plurality of different light sources because different insects are attracted to different types of light Depending on the time of year and the geographic location of the insect trap, different insects are going to be present To ensure that the insect trap will be effective in any location or climate, the insect attracting mechanism provides a plurality of light emitting devices. The light emitting devices include, but are not limited to, light emitting diodes (LED), ultraviolet and fluorescent light sources.

Once the insects are attracted into the vicinity of the insect trap a suction producing device draws the insects into the support framework of the insect trap. The suction producing device is located in an open end of the support framework. The support framework is preferably a cylindrical shaped support piece with open top and bottom ends. The support framework is preferably made from PVC, plastic or lightweight metal, but can be made from any suitable lightweight material. In preferred embodiments of the present invention the suction producing device is a motor powered propeller blade fan.

At least one section of netting is attached to the other open end of the support framework. Once the insects are drawn into the support framework the fan blows the insects into the netting for collection. In certain embodiments the insect trap has one large section of netting. The netting has continuously convergent sides that become narrower at its closed distal end then at the open end attached to the support framework. The netting is thus funnel shaped. It is important that the netting is shaped in this manner so that the insects that are drawn in to the netting at high velocity collect at the end of the netting and do not tear through the sides of the netting. In certain embodiments of the present invention there are two separate sections of netting. In this situation the large section of netting attached to the support framework has openings at both ends of the netting. A smaller section of netting is attached to the distal end of the large section of netting. The netting is preferably made from a synthetic plastic including, but not limited to, nylon and polyester.

A releasable fastening device is provided for opening and closing access to the netting. Access to the netting is necessary in order to empty the collected insects from the netting. In certain preferred embodiments where only one piece of netting is used, the releasable fastening device is a zipper. In certain preferred embodiments where two separate pieces of netting are used, the fastening device is Velcro. The Velcro functions to secure the two pieces of netting together. When the collected insects need to be discarded the smaller section of netting is released from the larger piece of netting.

The insect trap is equipped with a plurality of fan guards to prevent contact with the fan blades. The fan guards are located on top of and on bottom of the fan. The fan guards are preferably wire mesh cages that prevent the user from contacting the fan blades but do not impede the path of the attracted insects into the collection netting. The insect trap also provides a mounting means for hanging the insect trap.

Accordingly, it is a principal object of the invention to provide an attractive insect trap with a plurality of light sources to effectuate efficient insect trapping no matter where or when the trap is used.

It is another object of the invention to provide an insect trap with a means for easily emptying and disposing of the trapped insects.

It is a further object of the invention to provide an efficient insect trap that is not required to run all night long and may be used for short periods of time.

Still another object of the present invention is to provide an insect trap that covers a wide area so that a maximum number of insects in a certain area are trapped and once the insect trap is turned off the area remains insect free for an extended period of time.

It is an object of the invention to provide improved elements and arrangements thereof for the purposes described which is inexpensive, dependable and fully effective in accomplishing its to intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
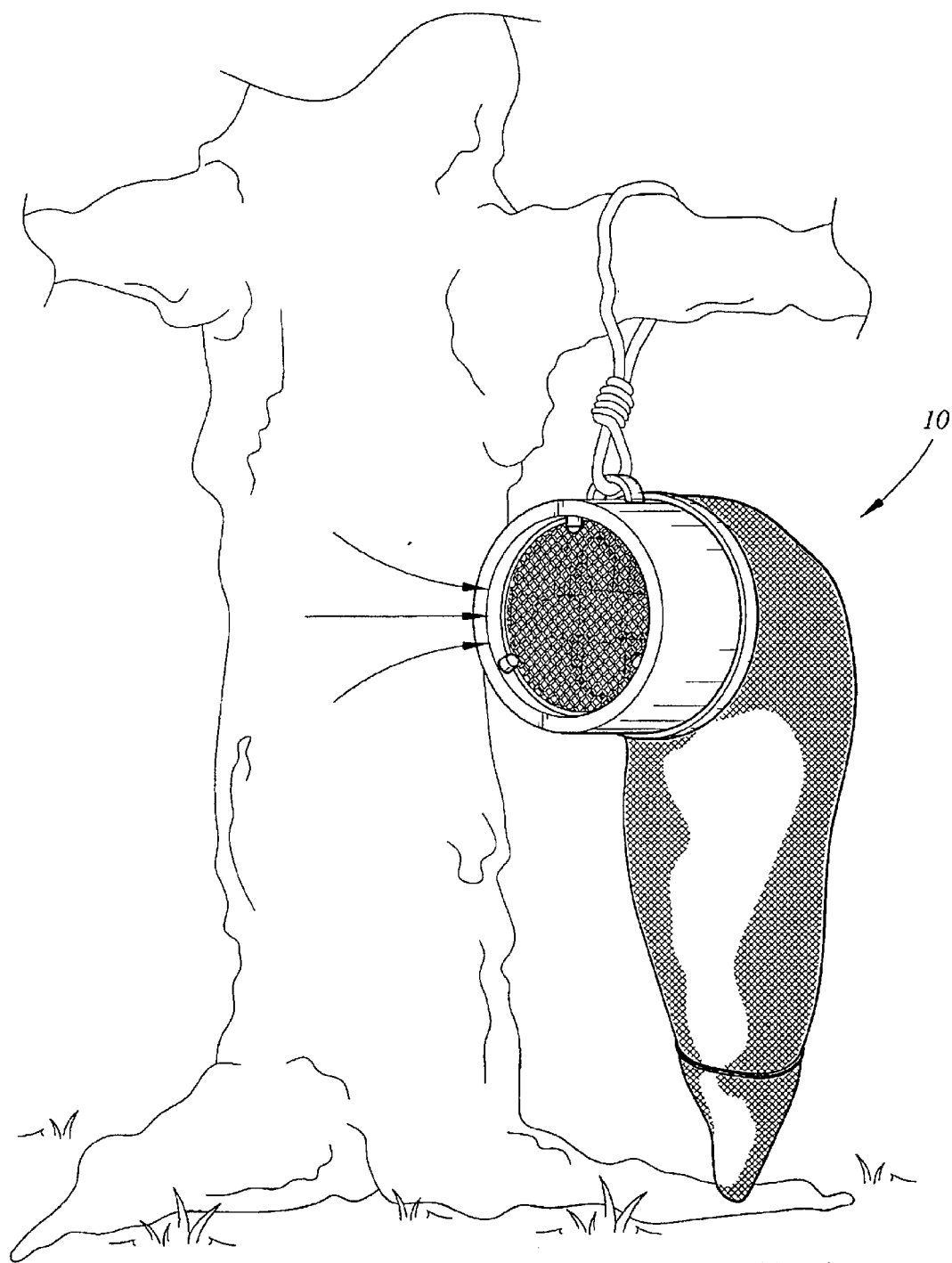
FIG. 1 is an environmental, perspective view of a light emitting insect trap according to the present invention.

The present invention is a light emitting insect trap for attracting and subsequently trapping multiple varieties of insects. The light emitting insect trap uses a light source to attract insects into the proximity of the insect trap. Once the insects are attracted to the insect trap a suction-producing device draws the attracted insects into the trap where they are collected inside of a section of netting. FIG. 1 depicts an environmental, perspective view of a preferred embodiment of the light emitting insect trap 10. In FIG. 1 the light emitting insect trap 10 is shown mounted to a branch of a tree.

Figure 2:
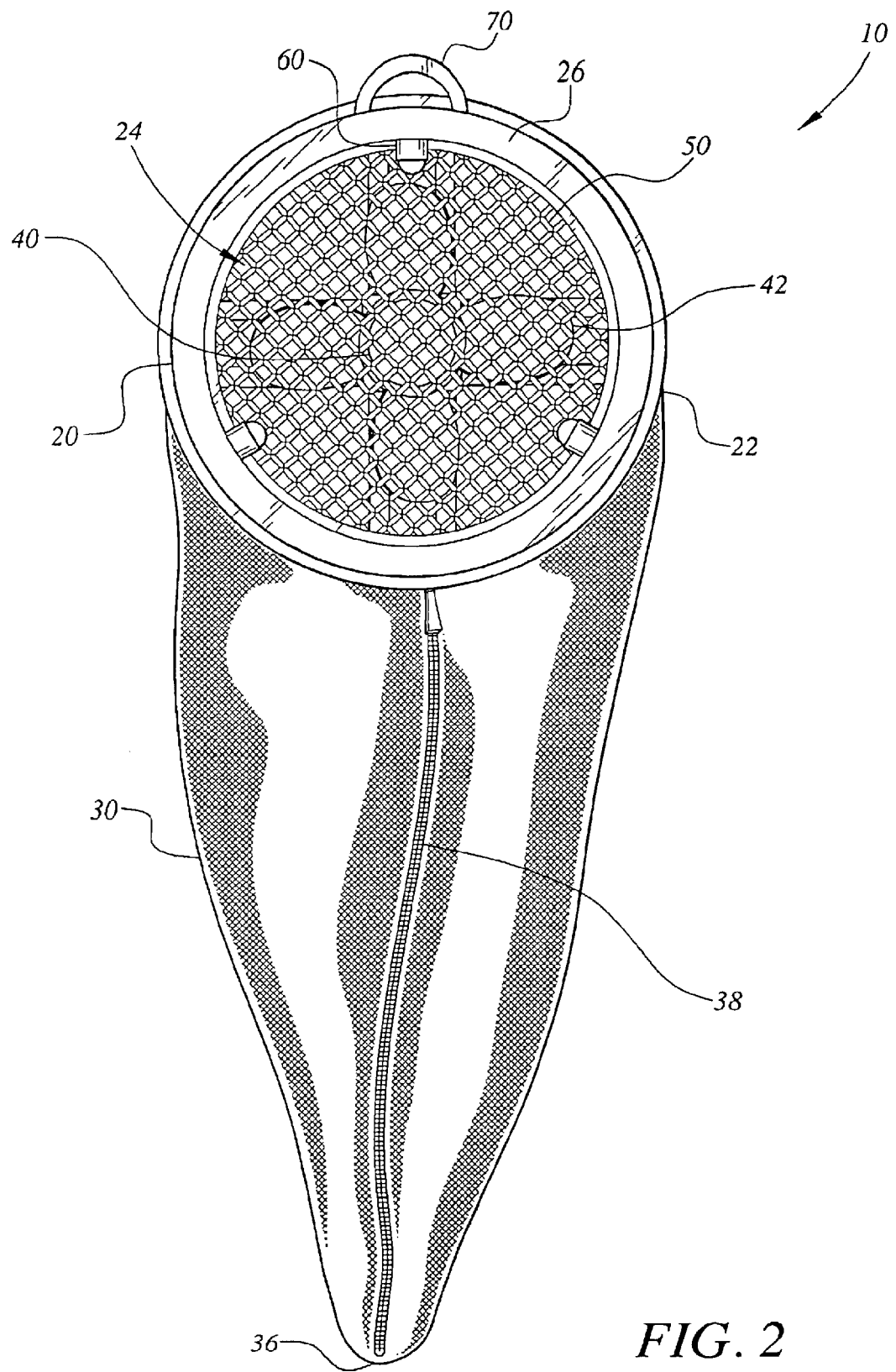
FIG. 2 is a front view of a first embodiment of the light emitting insect trap with a Velcro strip for emptying the insect trap.

FIG. 2 depicts a front view of a first preferred embodiment of the present invention. Preferred embodiments of the light emitting insect trap 10 comprise a support framework 20, a large section of netting 30, a net fastening device 38, a suction producing mechanism 40, a plurality of fan guards, an insect attracting mechanism 60 and a mounting means 70.

The support framework 20 is cylindrical in shape with an open bottom end 22 and an open top end 24. The support framework 20 is made from a lightweight sturdy material that is capable of supporting the insect trap 10. In preferred embodiments of the present invention the support framework 20 is made from either PVC, plastic or lightweight metal, depending on the use of the insect trap 10. The framework 20 is not limited to these materials and may use any suitable lightweight material. The insect trap 10 may also be constructed in different sizes depending on the use of the insect trap 10. In situations where the insect trap 10 is used for personal backyard use, where the amount of property is not large, the insect trap 10 will be smaller. In commercial situations a larger unit can be used.

The suction producing mechanism 40 is located inside of the open top end 24 and is secured to the interior of the support framework 22. In preferred embodiments of the light emitting insect trap 10 the suction-producing device 40 is a motor powered propeller blade fan. The suction-producing device 40 is not limited to propeller blade fans and may be any suitable device for creating a downdraft into the insect trap 10.

The insect attracting mechanism 60 is attached to the support framework 20 at the outer edge 26 of the top open end 24. In preferred embodiments the insect attracting mechanism 60 is a set of light emitting devices. In preferred embodiments, the light emitting insect trap 10 provides three light emitting devices 60, however any number of light emitting devices may be used with the present insect trap 10. In preferred embodiments of the insect trap 10 the light emitting devices 60 provide different forms of light. It is important to provide different forms of light because certain insects are only attracted to certain forms of light. The insect trap 10 will be used to attract different insects depending on the location of the insect trap 10 and when it is used. In order to insure that the insect trap 10 will be effective at any time of the year and in any geographic location different forms of light must be provided. Preferred embodiments of the insect trap will provide light emitting diodes (LEDs), florescent light sources and ultraviolet light sources. The light emitting devices 60 are not limited to these forms of light and may use any form of light suitable for attracting insects. The light emitting devices 60 are mounted inside the support framework 20 just below the open top end 24. The light emitting devices 60 are electrically powered so the insect trap 10 is equipped with an electrical plug (not depicted in the figures).

The insect trap 10 is equipped with a mounting mechanism 70 for attaching the insect trap 10 to a tree, building, post or other structure. In preferred embodiments the mounting mechanism 70 is a ring bracket The mounting mechanism 70 is not limited to only ring brackets and may be any suitable device for mounting the light emitting insect trap 10.

At least one section of netting 30 is attached to the open bottom end 22 of the support framework 22. The netting 30 has continuously converging sides that become narrower at the distal end 36 of the netting 30 than at the open bottom end 22 of the framework 20. The section of netting 30 thus has a funnel shape. It is important that the netting 30 have a funnel shape so that the insects, which are drawn into the netting at a high velocity, do not tear through the walls of the netting 30. The netting 30 is preferably made from a synthetic plastic, including but not limited to nylon and polyester. The netting 30, however, may be made from any suitable material.

The netting 30 is provided with a net fastening device 38. The net fastening device 38 functions to open and close access to the interior of the netting 30. In order to discard of the collected insects inside of the netting 30 the user must open the net fastening device 38. In the preferred embodiment depicted in FIG. 2 the net fastening device 38 is a zipper.

Figure 3:
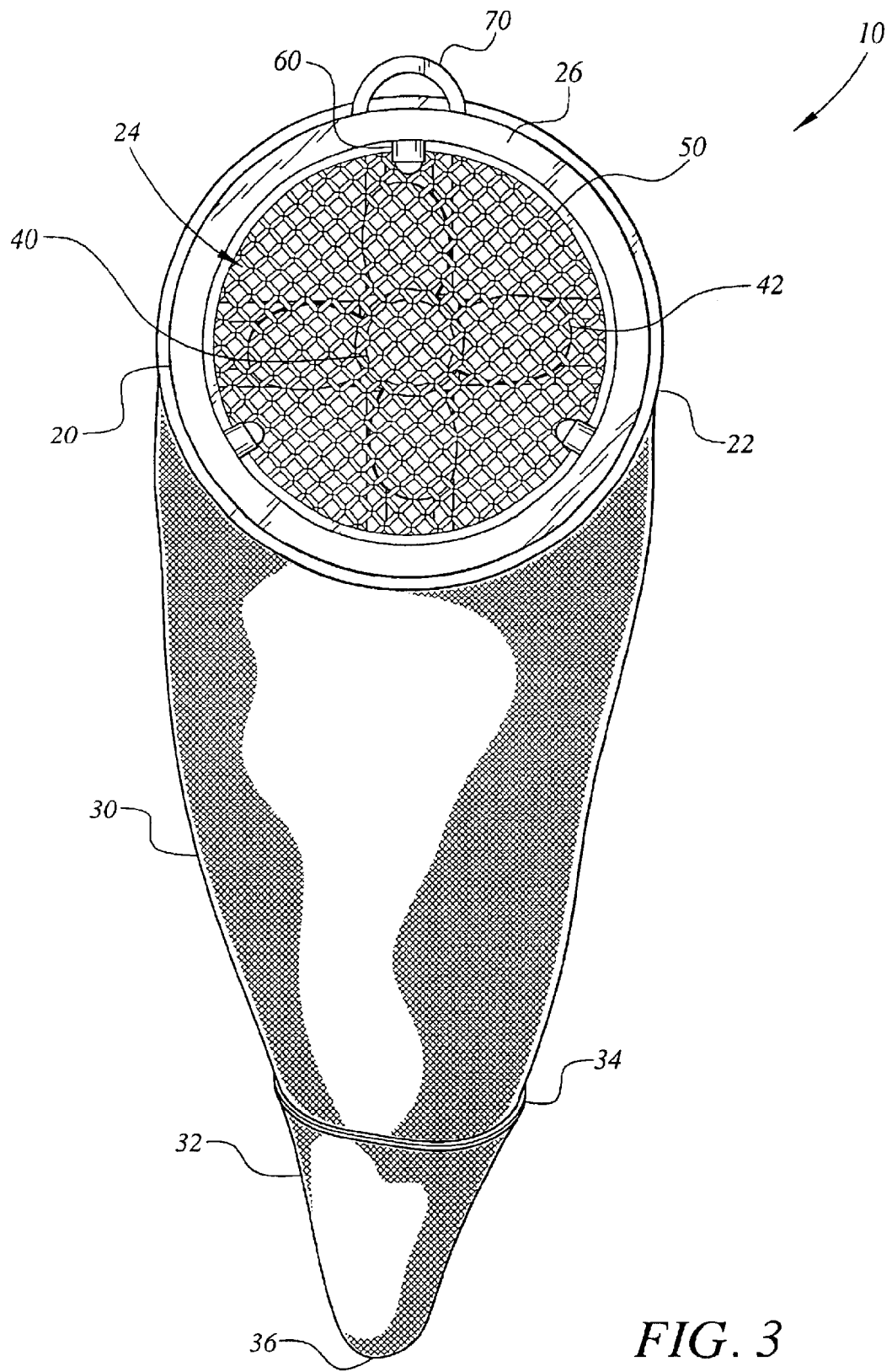
FIG. 3 is a front view of a second embodiment of the light emitting insect trap with a zipper for emptying the insect trap.

FIG. 3 depicts an alternate embodiment of the light emitting insect trap 10. In this alternate embodiment the insect trap 10 has two separate sections of netting. There is a first large section of netting 30 and a second smaller section of netting 32. The insects that are drawn into the insect trap 10 collect at the bottom of the smaller section netting 32. To dispose of the collected insects the smaller section of netting 32 is removed from the larger section of netting 30 by releasing the net fastening device 34. In the present embodiment the net fastening device 34 is Velcro.

Figure 4:
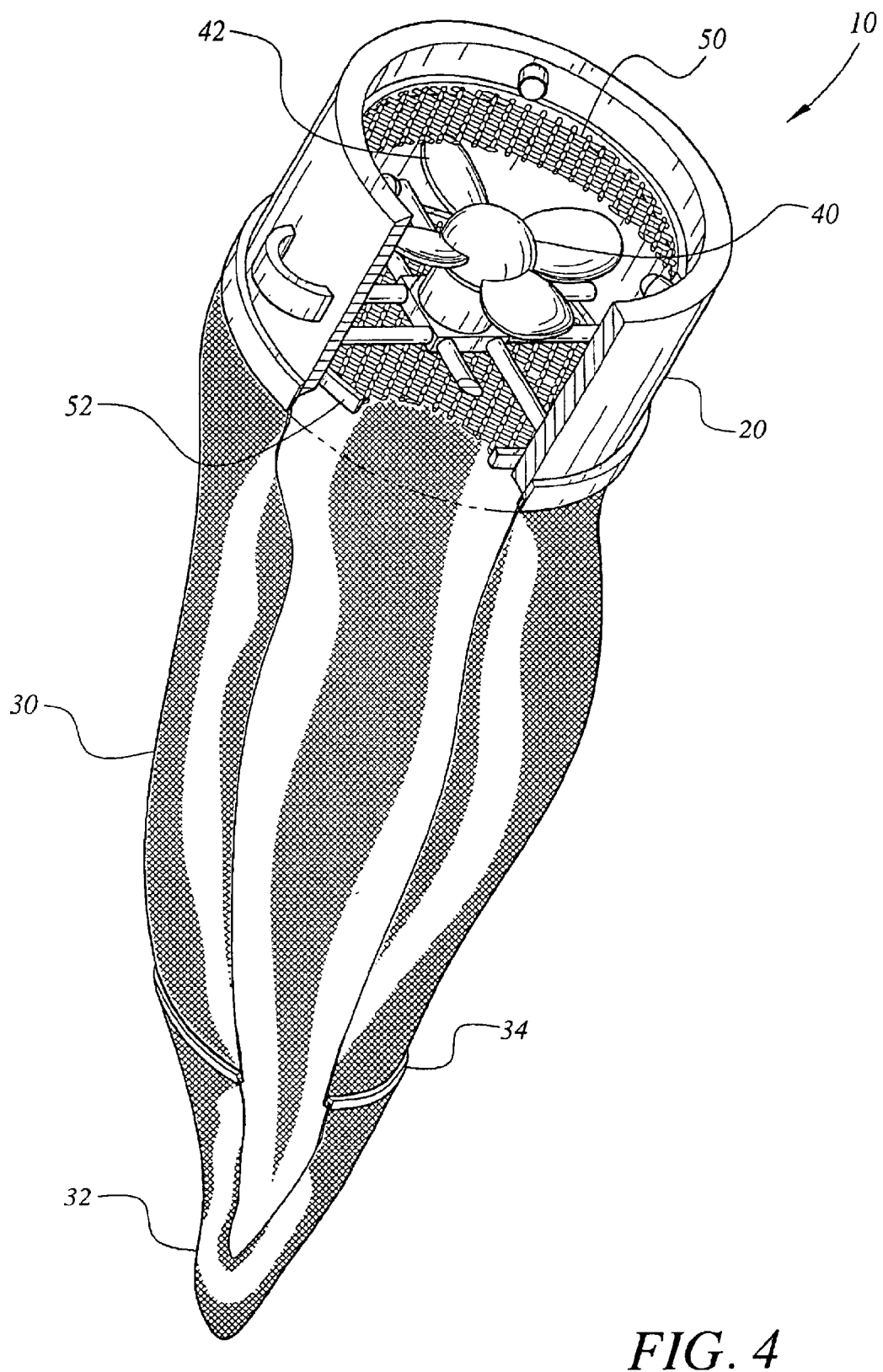
FIG. 4 is an interior view of the light emitting insect trap depicting the position of the fan guards.

FIG. 4 depicts an interior view of the light emitting insect trap 10. FIG. 4 depicts the preferred location of the plurality of fan guards. In preferred embodiments the insect trap 10 is equipped with two fan guards 50 and 52. The upper fan guard 50 is located above the fan 40 in the top open end 24 of the support framework 20. The lower fan guard 52 is located inside of the support framework 20 below the fan 40. The fan guards prevent the user of the insect trap 10 from contacting the blades 42 of the fan 40. The upper fan guard 50 is releasably attached to the support framework so that the fan guard 50 may be removed to replace the light emitting devices 60. The fan guards 50 and 52 are preferably made from a wire mesh cage that prevents contact with the blades while not impeding the path of the attracted insects.

Insects are attracted to the proximity of the insect trap 10 by the light emitting devices 60. Once in the proximity of the insect trap 10, the attracted insects are then drawn into the insect trap 10 by the downdraft created by the fan 40. The fan 40 forces the insects through the support framework 20 where they collect in the bottom of the netting 30. Once the netting 30 is filled the collected insects are discarded by releasing the net fastener 38 and dumping the insects.

It is to be understood that the present invention is not limited to the embodiments described above, but encompasses any and all embodiments within the scope of the following claims.

I claim:

1. An insect trap comprising:
   a generally cylindrical support framework having an open top end, an open bottom end, an exterior surface and an interior surface;
   a suction producing mechanism located inside of said support frame, the suction producing mechanism being disposed between the open top end and the open bottom end;
   at least one section of netting attached to the open bottom end of said support framework;
   a releasable fastening device disposed on the at least one section of netting for opening and closing access to the netting;
   an insect attracting mechanism, wherein said insect attracting mechanism comprises a plurality of light emitting devices located on and along the interior surface of said support framework adjacent the top opening;
   a top wire mesh fan guard disposed across the support framework adjacent the top opening between the suction producing mechanism and the light emitting devices, whereby the top fan guard prevents contact with the suction producing mechanism when accessing the light emitting devices;
   a bottom wire mesh fan guard disposed across the support framework adjacent the bottom opening below the suction producing mechanism for preventing contact when opening the netting; and
   a mounting device disposed along the exterior surface of the support framework;
   whereby insects that are attracted into a proximity of the insect trap are drawn into the insect trap by the suction producing mechanism and collected in said at least one section of netting.

2. The insect trap according to claim 1, wherein the at least one section of netting comprises a large section of netting and a smaller section of netting, wherein the smaller section of netting is releasably attached to a bottom end of the large section of netting by said releasable fastening device.

3. The insect trap according to claim 1, wherein said at least one section of netting has an opening at a first end adjacent to the support framework and a closed second end.

4. The insect trap according to claim 3, wherein said at least one section of netting has continually convergent sides that become increasingly narrow at the closed second end than at the open first end resulting in the at least one section of netting having a funnel shape.

5. The insect trap according to claim 1, wherein said suction producing mechanism is a motor driven propeller blade fan.

6. The insect trap according to claim 1, wherein said support framework is made of a material selected from the group consisting of PVC, plastic and light weight metal.

7. The insect trap according to claim 1, wherein said at least one section of netting comprises a synthetic plastic selected from the group consisting of nylon and polyester.

8. The insect trap according to claim 1, wherein said releasable fastening device is selected from the group consisting of zippers and Velcro.

9. The insect trap according to claim 1, wherein said insect attracting mechanism comprises three light sources.

10. The insect trap according to claim 9, wherein said insect attracting mechanism comprises three different types of light sources.

11. The insect trap according to claim 9, wherein said light sources are selected from the group consisting of light emitting diodes, fluorescent lights and ultraviolet lights.

* * * * *